March 30, 1954  J. M. HARGRAVE  2,673,714
ROCK OR MASONRY DRILL
Filed Aug. 5, 1950
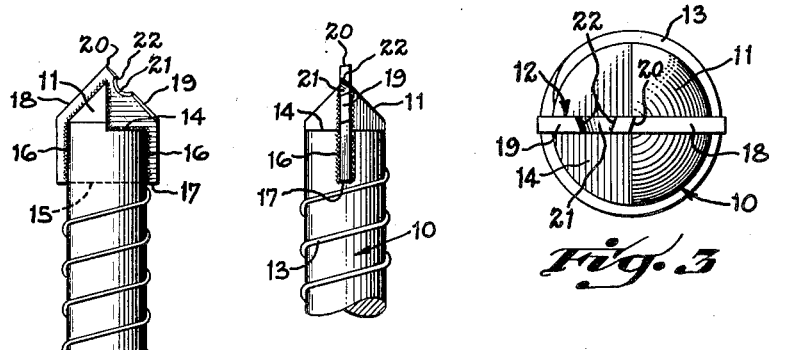
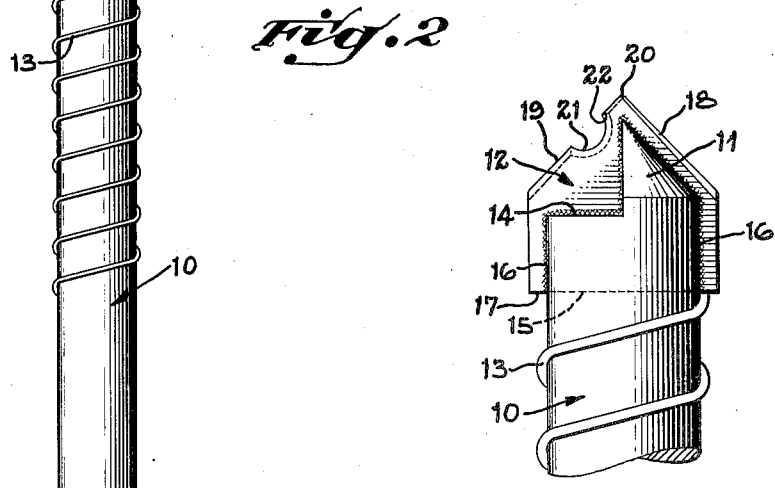
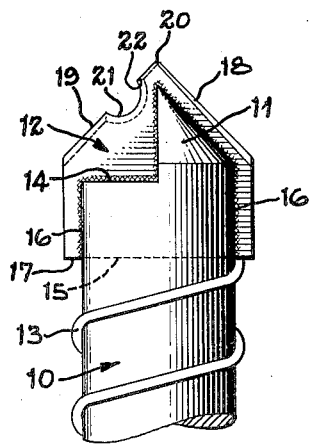
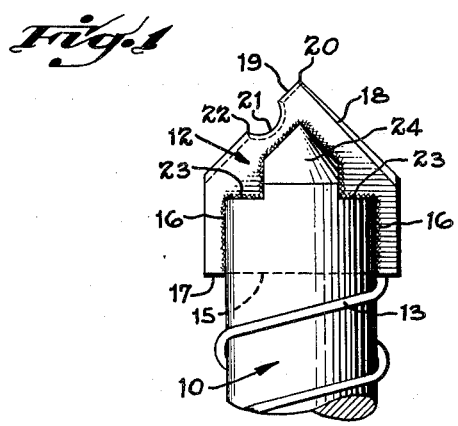
INVENTOR.
John M. Hargrave
BY
Wood, Arey, Herron & Evans
ATTORNEYS Patented Mar. 30, 1954

2,673,714

UNITED STATES PATENT OFFICE 2,673,714

ROCK OR MASONRY DRILL

John M. Hargrave, Cincinnati, Ohio

Application August 5, 1950, Serial No. 177,847

5 Claims. (Cl. 255—61)

This invention relates to drills of the type used for drilling holes into stones, rocks, masonry and the like and is particularly directed to a novel arrangement of the cutting edges of such drills.

It has been found that for drilling these nonmetallic materials, which are of a particularly abrasive nature, that cutting edges of a cemented carbide or similar material are particularly effective. A typical drill of this type is formed by milling a slot across the end of the steel drill shank and then brazing a carbide tip into the slot. The tip is constructed from a relatively thin plate and is provided with two angular cutting edges which meet to form a sharp chisel edge. To complete the drill, a wire is fixed spirally along the shank from the tip jointure toward the shank end, or other means are provided to form chip extracting flutes. This spiral wire functions much as a screw to convey the rock chips from the tip to the exterior of the hole where they are discharged.

In drills of this type, the rock or the like is cut by two kinds of cutting action. First, the chisel edge, formed by the jointure of the two principal cutting edges, crushes the rock and pushes it aside until it is picked up by the spiral chip conveyor and carried free from the work. Secondly, the two principal cutting edges of the drill are harder than the rock and are placed against it with sufficient force to exceed the critical unit stress in the weaker material at the contact points. This action of the principal cutting edges is such that small quantities of rock are progressively severed to form chips which are also conveyed free from the work by the spiral chip conveyor.

There are many considerations entering into the design of drills of this type. One critical factor is the speed at which the drill is rotated. If the speed is too low the power requirement of the drill is excessive and hence a larger and more expensive motor is required. Also, the efficiency of the drill, in terms of horsepower per cubic foot of rock removed, falls off with the decrease in speed.

A second design factor which requires consideration is the durability of the drill. Due to the particularly abrasive nature of the materials such as rock, masonry, etc., upon which these drills are used, it is essential that some provision be made to reduce the wear on the cutting edges in order to prolong the life of the drill. The use of a material such as tungsten carbide which is of a particularly durable nature has helped greatly to solve the problem of prolonging tool life.

In this regard, however, it is desirable not only that the drill be made as durable as possible, consonant with reasonable cost, but further that it be of such a shape that after it is worn slightly it can be quickly sharpened by a simple grinding operation.

The drills in previous use fall generally into three categories; those having flutes of the conventional variety, those having a solid cutting tip inserted in a shank, and those having a highly irregular cutting tip inserted in the shank. Each of these drills has inherent limitations which are overcome by the present invention. For instance, in the conventional fluted drill, it is not practical to use an especially abrasion resistant material, such as tungsten carbide; therefore the drill is not nearly so durable as might be desired.

The type of drill having a solid tip does have the advantage of durability since the tip may be fashioned from a material having good wear resistant characteristics, but due to the full cutting action of both edges presenting a high resistance to rotation, such a drill is not adapted to high speed rotation with the advantages of greater efficiency and lower power consumption outlined above.

The highly irregular shaped tip, while it does permit a higher speed of rotation since each edge is taking only a partial cut each revolution is undesirable for the reasons that it is difficult to sharpen once it becomes dull because of the many cutting surfaces involved and secondly, the tooth-like projections are more likely to break off than is a more solid tip.

With these considerations in mind, the inventor has provided a drill having an improved arrangement of cutting edges so that a more rapid and efficient drilling operation can be accomplished and at the same time has provided a drill that is durable and can readily be maintained in a sharpened condition.

An object of this invention is to provide a drill which, due to the novel arrangement of its cutting edges, requires less force to turn it per revolution and which, therefore, may be revolved at a higher rate of speed with a lower power requirement than drills heretofore commonly in use.

A further object of this invention is to provide a drill in which the chips as they are severed are urged away from the cutting edges so that they may be picked up by the spiral chip conveyor and carried free of the work.

An additional object of this invention is to provide an improved drill in which the cutting edges may be made of a particularly abrasion resistant material such as tungsten carbide and then readily assembled with a shank made of hardened steel, to complete the drill assembly.

A further object of this invention is to provide a drill in which the cutting edges may be sharpened by a simple grinding operation in a minimum of time.

These and additional objects and advantages of this invention will be more fully apparent from a consideration of the specification taken in conjunction with the drawing in which:

Figure 1 is an elevational view of the improved drill.

Figure 2 is a partial elevation of the drill rotated 90° from Figure 1.

Figure 3 is an end view of the drill illustrating the relationship of the cutting edges.

Figure 4 is an enlarged elevational view of the drill tip rotated 180° from Figure 1.

Figure 5 is an elevational view showing a modification of the notch.

The drill generally comprises a shank 10 having a conical head 11, a tip 12, and a spiral chip conveyor 13. More specifically, the shank 10 is a cylindrical bar having a conical head 11 fashioned on one end. In the embodiment shown in Figures 1–4 half of the conical head 11 and part of the shank 10 are removed to form a chip receiving notch 14 extending outwardly from a diameter of the shank.

A modification is shown in Figure 5 in which the chip receiving notches 23—23 are formed by removing part of the conical head 11 and shaft 10 along two parallel chords leaving the central portion 24 of the head to support the tip 12. It will be noted that in either the embodiment shown in Figures 1 to 4 or the embodiment shown in Figure 5 that the chip receiving notch or notches are formed by removing an endwise chordal segment of the head and shank. In other words in both embodiments of the chip receiving notch, all of that portion of the head and shank extending outwardly from a chordal line is removed down to a predetermined depth. A narrow slot 15 is formed in the shank along a diameter perpendicular to the diameter or chords along which the conical head is cut. A hardened cutting tip 12 is fitted into this slot 15 and is secured in place by brazing 16 or some similar means.

The cutting tip 12 itself is a flat plate constructed from a particularly abrasion resistant material, such as tungsten carbide. Its lower portion 17, substantially rectangular in cross section, is adapted to fit into the slot 15 formed in the shank 10. The tip 12 is provided with two angular cutting edges 18, 19 which meet to form a sharp chisel edge or point 20. Each of these principal cutting edges 18 and 19 is bevelled slightly away from the leading face in order to provide a sharper cutting surface. One of the principal cutting edges 19 has a recess 21 formed therein which preferably extends about one-third of the length of the cutting edge 19 and is located near its center. The peripheral edges 22 of this recess 21 are also slightly bevelled in the direction away from the leading face of the tip. In a preferred embodiment of this device, the recess 21 is so shaped that it may be formed and its peripheral edges automatically bevelled by feeding the tip at an angle against a standard grinding wheel. It will be noted that the lower portion 17 of the cutting tip 12 extends beyond the diameter of the shank 10, thus affording chip clearance along the shank for the removal from the work of the rock chips as they are cut.

In operation, as the drill is forced into the rock, the cutting edge 19 containing the depression 21 will cut two concentric grooves separated by an annular projection which remains uncut due to the recess in the cutting edge. This annular projection is removed, on the further advance of the tool, by the opposite cutting edge 18 in its pass over that portion of rock. As the chips are severed from the rock, they are forced free from the cutting edges 18, 19 into the notched portion 14 of the conical head 11 and are then urged outwardly by the rotative action of the shank 10 and are picked up by the spiral wire chip conveyor 13 by which they are carried to the surface and discharged free of the hole.

It can be seen that one cutting edge of the tool is removing only a fraction of the rock over which it is passing, thus the amount of force required to revolve the tool is less than would be necessary if the cutting edge were taking a full cut, that is, not leaving the uncut annular rock projection. The result of this is that the tool may be rotated at a higher rate of speed and with a lower power consumption than would otherwise be the case. Furthermore, the efficiency of the tool is greatly aided by the action of the chip receiving notch in the conical head and shank into which the chips are forced as they are severed from the rock. Thus, the chips are urged free of the cutting edges of the tip even before they become engaged with the spiral chip conveyor. This provision of a chip clearance space reduces the tendency of the chips to become wedged in the grooves being cut and thus impede the action of the cutting edges.

It is apparent from its configuration that the tip 12 may be sharpened, when it becomes dull, by grinding the two bevelled cutting edges 18, 19 and the peripheral edges 22 of the recess 21. This represents a relatively simple operation which may be performed on a standard grinder in a minimum of time.

Having described my invention, I claim:

1. In a rock or masonry drill, the combination of a shank having a conical head at one end thereof, an endwise chordal segment of said shank and said head being removed, said shank and said conical head having a slot formed therein, said slot being disposed parallel to the axis of said shank, a flat cutting tip inserted in said slot, said cutting tip having two angular cutting edges, said edges being formed on opposite sides of said tip, and meeting at a chisel point disposed for initial penetration of the surface being cut, one of said edges having a recess formed therein.

2. In a rock or masonry drill, the combination of a shank having a conical head at one end thereof, an endwise chordal segment of said shank and said head being removed, said shank and said conical head having a slot formed therein, said slot being disposed parallel to the axis of said shank, a flat cutting tip inserted in said slot, said cutting tip having two angular cutting edges, said edges being formed on opposite sides of said tip, and meeting at a chisel point disposed for initial penetration of the surface being cut, one of said edges having a recess formed therein, and means for conveying chips free from the rock being cut.

3. In a rock or masonry drill, the combination of a shank having a conical head at one end thereof, said shank and said head having an endwise segment removed along a substantially chordal line, said shank and said conical head having a slot formed therein, said slot being disposed parallel to the axis of said shank and at substantially right angles to said chordal line, a flat cutting tip inserted in said slot, said cutting tip having two angular cutting edges, said edges being formed on opposite sides of said tip, and meeting at a chisel point disposed for initial penetration of the surface being cut, one of said edges having a recess formed therein.

4. In a rock or masonry drill, the combination of a shank having a conical head at one end thereof, said shank and said head having an endwise segment removed along a substantially chordal line, said shank and said conical head having a slot formed therein, said slot being disposed parallel to the axis of said shank and at substantially right angles to said chordal line, a flat cutting tip inserted in said slot, said cutting tip having two angular cutting edges, said edges being formed on opposite sides of said tip and meeting at a chisel point disposed for initial penetration of the surface being cut, one of said edges having a recess formed therein, said recess being formed in a portion of said cutting edge adjacent the removed segment of said conical head.

5. In a rock or masonry drill, the combination of a shank having a conical head at one end thereof, a first endwise chordal segment of said shank and said head being removed from one side of said shank and head, and a second endwise chordal segment being removed from the opposite side of said shank and head, said shank and said conical head having a slot formed therein, said slot being disposed parallel to the axis of said shank and extending between said removed segments, a flat cutting tip inserted in said slot, said cutting tip having two angular cutting edges, said edges being formed on opposite sides of said tip and meeting at a chisel point disposed for initial penetration of the surface being cut, one of said edges having a recess formed therein.

JOHN M. HARGRAVE.

References Cited in the file of this patent

UNITED STATES PATENTS

| Number | Name | Date |
| --- | --- | --- |
| 93,684 | Davis | Aug. 17, 1869 |
| 1,847,302 | Emmons | Mar. 1, 1932 |

FOREIGN PATENTS

| Number | Country | Date |
| --- | --- | --- |
| 325,383 | Great Britain | Feb. 20, 1930 |
| 351,273 | Germany | Apr. 4, 1922 |
| 363,982 | Great Britain | Dec. 31, 1931 |
| 375,596 | Great Britain | June 20, 1932 |
| 427,654 | Great Britain | Apr. 29, 1935 |
| 584,050 | Germany | Sept. 14, 1933 |